(12) United States Patent
Lin et al.

(10) Patent No.: US 8,558,145 B2
(45) Date of Patent: Oct. 15, 2013

(54) HEAT RETAINING BOTTLE

(75) Inventors: Chiencheng Lin, Taipei (TW); Yuefeng Zheng, Taipei (TW)

(73) Assignee: Chien-Cheng Lin, Taipei (TW)

( * ) Notice: Subject to any disclaimer, the term of this patent is extended or adjusted under 35 U.S.C. 154(b) by 281 days.

(21) Appl. No.: 12/863,312

(22) PCT Filed: Jan. 16, 2008

(86) PCT No.: PCT/CN2008/070119
§ 371 (c)(1),
(2), (4) Date: Oct. 8, 2010

(87) PCT Pub. No.: WO2009/089690
PCT Pub. Date: Jul. 23, 2009

(65) Prior Publication Data
US 2011/0132893 A1    Jun. 9, 2011

(51) Int. Cl.
*F27D 11/00* (2006.01)

(52) U.S. Cl.
USPC .................................. 219/441; 219/438

(58) Field of Classification Search
USPC ......... 219/441, 438, 387, 436, 415, 439, 433, 219/549, 735, 432; 99/285, 288, 453, 422, 99/426; 220/592.27, 592.2, 475.1
See application file for complete search history.

(56) References Cited

U.S. PATENT DOCUMENTS

| 6,276,264 | B1 * | 8/2001 | Dumm .......................... 99/455 |
| 6,943,323 | B2 * | 9/2005 | Iannucci ...................... 219/438 |
| 2004/0164058 | A1 * | 8/2004 | Sanders et al. ........... 219/121.39 |
| 2007/0131676 | A1 * | 6/2007 | Clothier et al. ............... 219/618 |

FOREIGN PATENT DOCUMENTS

| CN | 1310977 A | 9/2001 |
| CN | 2910066 Y | 6/2007 |
| JP | 2001198022 A | 7/2001 |

OTHER PUBLICATIONS

International Searching Authority, International Search Report issued for PCT/CN2008/070119, 6 pages, mailed on Oct. 23, 2008.

\* cited by examiner

*Primary Examiner* — Henry Yuen
*Assistant Examiner* — Phuong Nguyen
(74) *Attorney, Agent, or Firm* — Hanley, Flight & Zimmerman, LLC

(57) ABSTRACT

A thermos consists of a body, a cap and a heating device. The body has an inner wall, an outer wall and a bottle opening, where an intermediate space is formed between the inner and outer walls. The cap is fitted to the bottle opening. The heating device contains an induction coil, a donut magnet and a resistance heater. The induction coil is wound in the inner wall. The donut magnet is placed in the intermediate space and it can move freely within the intermediate space. The resistance heater is electrically connected to the induction coil and touches the inner wall.

3 Claims, 5 Drawing Sheets

HEAT RETAINING BOTTLE

FIELD OF THE INVENTION

This invention concerns a thermos with a heating function.

DESCRIPTION OF RELATED ART

Water is essential to daily life. In order to be accessible to water at all time, people choose to use containers to hold water. However, a typical container usually cannot keep the water warm. But in many occasions, for example, camping and hiking, hot water is needed for food preparation. Therefore, a thermos is an essential device for backpackers and other people.

FIG. 1 is an illustration of the prior art. The thermos 10 consists of a body 12 and a cap 14. The body 12 has an inner wall 121, an outer wall 123 and a bottle opening 125.

The inner wall 121 is a hollow container used to hold water. The bottle opening 125, where the water can flow in, is located above the inner wall 121. The outer wall 123 is located outside the inner wall 121. An intermediate space 127 is formed between these two walls. In order to achieve heat preservation, the intermediate space 127 is usually filled with insulation material or vacuumed, to prevent heat transmission from the inner wall 121 to the outer wall 123. In addition, the surface of the inner wall 121 is usually polished to a mirror-finish, to preserve the heat in the inner wall 121. The cap 14 is fitted to the bottle opening 125. Its sealing degree also affects the preservation efficiency.

The method of heat preservation the prior art uses is to prevent the heat inside the bottle from dissipating to the outside. But up to now, there is not a thermos which can completely prevent heat dissipation. After a period of time, there is a significant decrease in the temperature of the hot water inside the thermos 10. Therefore, the thermos 10 cannot fully satisfy the need of a backpacker.

DESCRIPTION OF THE INVENTION

The purpose of this invention is to provide a thermos with automatic heating function and the ability to keep warm.

The thermos of this invention consists of a body, a cap and a heating device. The body has an inner wall, an outer wall and a bottle opening, where an intermediate space is formed between the inner and outer walls. The cap is fitted to the bottle opening. The heating device contains an induction coil, a donut magnet and a resistance heater. The induction coil is wound in the inner wall. The donut magnet is placed in the intermediate space and it can move freely within the intermediate space. The resistance heater is electrically connected to the induction coil and touches the inner wall.

When the thermos moves, the donut magnet will also move within the intermediate space. At the same time, the induction coil will produce an induced current due to the change of magnetic line of force. When the induced current passes through the resistance heater, it will produce heat and automatically heat up the inner wall, which in turn keeps the water at a certain temperature or at a higher temperature.

The heating device also contains a thermal switch which senses the temperature of the thermos. The thermal switch disconnects the electrical connection between the induction coil and the resistance heater when the temperature is higher than a set value, to avoid the danger of continued heating. In addition, the heating device also includes a rectifier and a charger. The rectifier will rectify the induced current first and send the current to the charger. Water can be heated as needed or the energy generated can be used on other electrical appliances.

The principle and advantages of this invention are described hereinafter with figures.

DETAILED DESCRIPTION OF THE EMBODIMENTS

FIG. 2 is an illustration of the first preferred embodiment of this invention. The thermos 20 consists of a body 21, a cap 23 and a heating device. 25, The body 21 has an inner wall 211, an outer wall 213 and a bottle opening 215, where an intermediate space 217 is formed between the inner wall 211 and the outer wall 213. The cap 23 is fitted to the bottle opening 215. The heating device 25 contains an induction coil 251, a donut magnet 253 and a resistance heater 255. The induction coil 251 is wound in the inner wall 211. The donut magnet 253 is placed in the intermediate space 217 and it can move freely within the intermediate space 217. The resistance heater 255 is electrically connected to the induction coil 251 and touches the inner wall 211.

When a backpacker carries this thermos 20 in the backpack, the thermos 20 will move as the backpacker walks. The donut magnet 253 inside the thermos 20 will move within the intermediate space 217. The induction coil 251 will produce an induced current due to the change of magnetic line of force. When the induced current passes through the resistance heater 255, it will produce heat and automatically heat up the inner wall 211. As long as the backpacker keeps walking, the heating device 25 will keep heating the water and keep the water at a certain temperature or at a higher temperature.

FIG. 3 illustrates the heating device of this invention. In addition to the induction coil 251, donut magnet 253 and the resistance heater 255, the heating device also contains a thermal switch 252, which senses the temperature of the thermos 20, a rectifier 254 and a charger 256. The thermal switch 252 disconnects the electrical connection between the induction coil 251 and the resistance heater 255 when the temperature is higher than a set value, to avoid the danger of continued heating. The direction changes every time the donut magnet moves back and forth, which results in different directions of current. Therefore, this invention can use a rectifier 254 to rectify the induced current first, and then send the current to the charger 256 for charging. Water can be heated as needed or the energy generated can be used on other electrical appliances.

FIG. 4 is an illustration of the second preferred embodiment of this invention. It is modified based on the first preferred embodiment. The differences are described hereinafter.

The thermos 20 contains a body 21, a cap 23 and a heating device 25. The body 21 consists of an inner wall 211, an outer wall 213, a bottle opening 215 and a heating room 219. The heating room 219 is constructed inside the intermediate space 217 between the inner wall 211 and the outer wall 213. The cap 23 is fitted to the bottle opening 215. The heating device 25 contains an induction coil 251, a bar magnet 257 and a resistance heater 255. The induction coil 251 is wound in the heating room 219 and the bar magnet 257 can move freely within the induction coil 251. The resistance heater 255 is electrically connected to the induction coil 251 and touches the inner wall 211.

The heating principle of this preferred embodiment is identical to the first preferred embodiment. A thermal switch 252, a rectifier 254 and a charger 256 (as shown in FIG. 3) may also be added to the heating device 25 of this preferred embodiment, in order to increase the efficiency of the thermos 20.

FIG. 5 is an illustration of the third preferred embodiment of this invention. It is modified based on the first preferred embodiment. The differences are described hereinafter.

The thermos 20 contains a body 21, a cap, 23 and a heating device 25. The body 21 consists of an inner wall 211, an outer wall 213 and a bottle opening 215. The cap 23, which is fitted to the bottle opening 215, contains a heating room 231. The heating device 25 contains an induction coil 251, a bar magnet 257 and a resistance heater 255. The induction coil 251 is wound in the heating room 231 and the bar magnet 257 can move freely within the induction coil 251. The resistance heater 255 is electrically connected to the induction coil 251 and heats the inner wall 211 when the cap 23 is fitted to the bottle opening 215.

The heating principle of this preferred embodiment is identical to the first preferred embodiment. A thermal switch 252, a rectifier 254 and a charger 256 (as show in FIG. 3) may also be added to the heating device 25 of this preferred embodiment, in order to increase the efficiency of the thermos 20.

The main innovations of this thermos bottle are transferred mechanical energy to electrical energy, then heating the inner solution of thermos.

DESCRIPTION OF THE MAIN ELEMENTS

Figure 1:
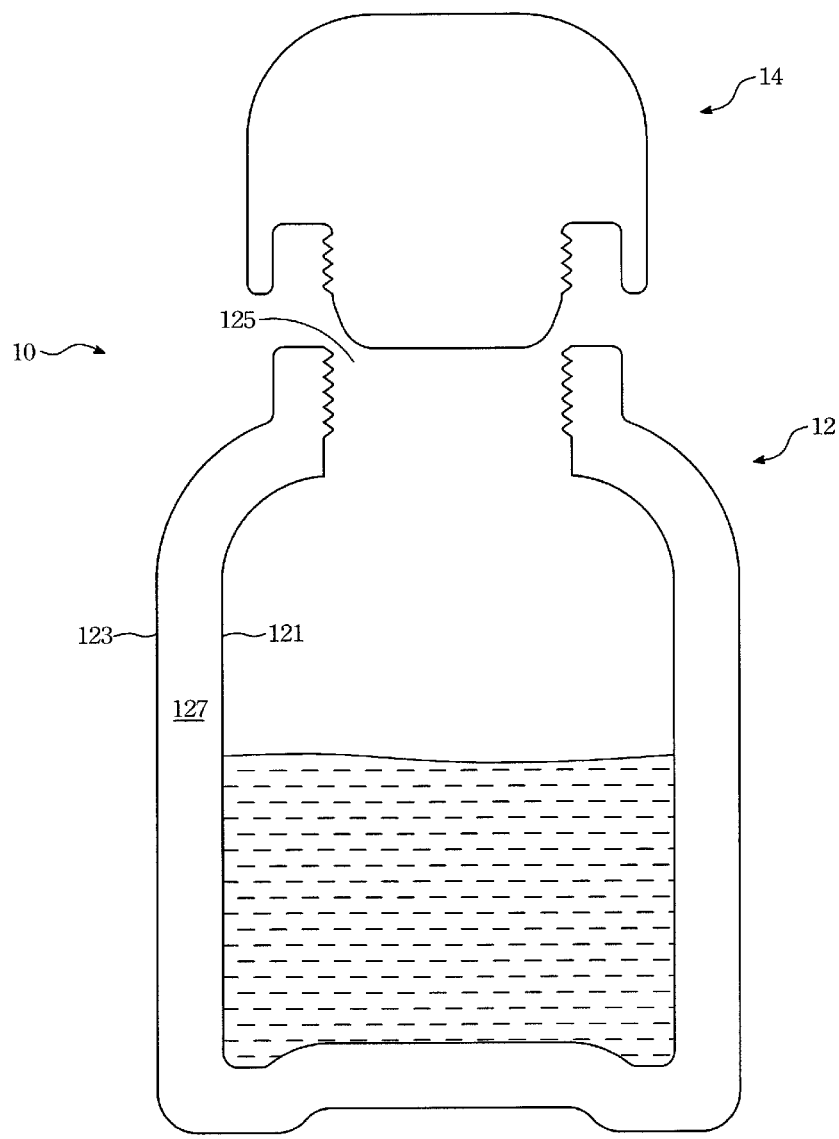
FIG. 1 is the illustration of the prior art.
Figure 2:
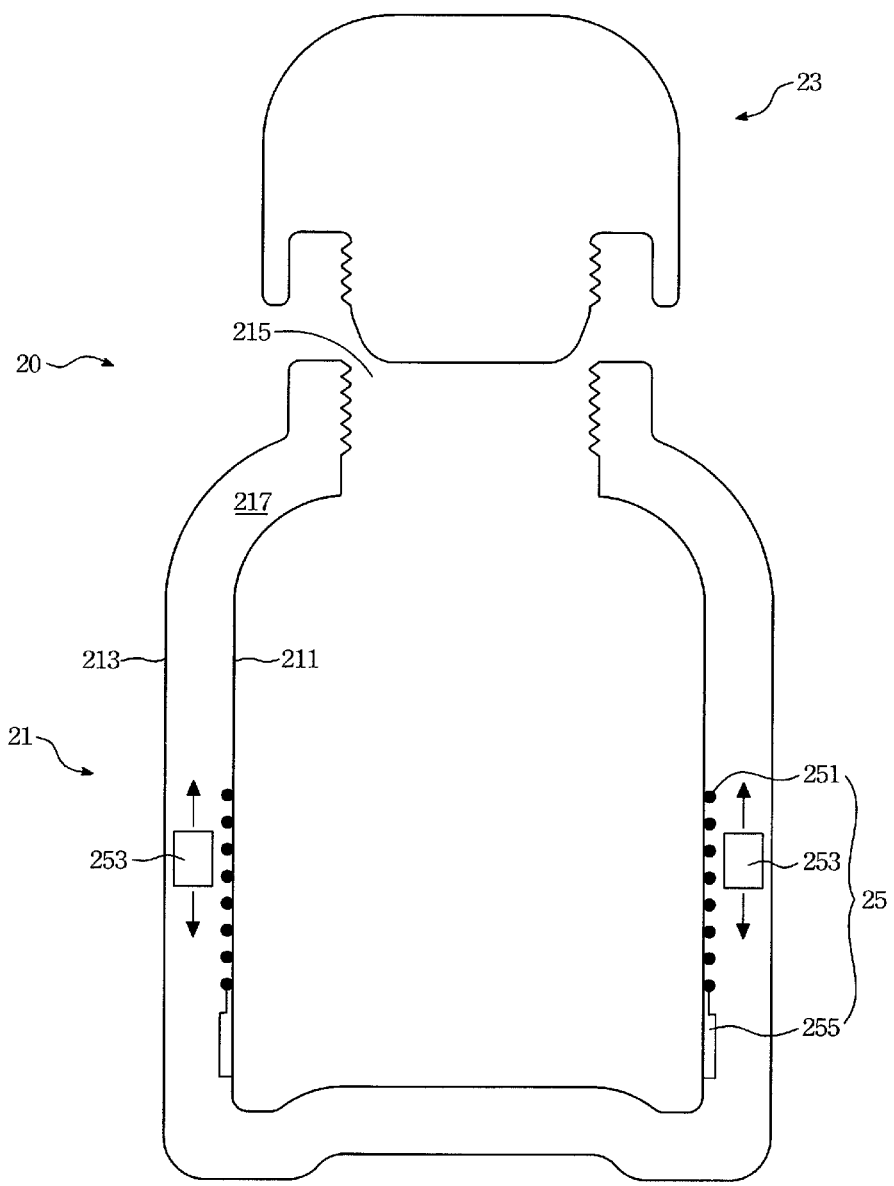
FIG. 2 is the first preferred embodiment of this thermos.
Figure 3:
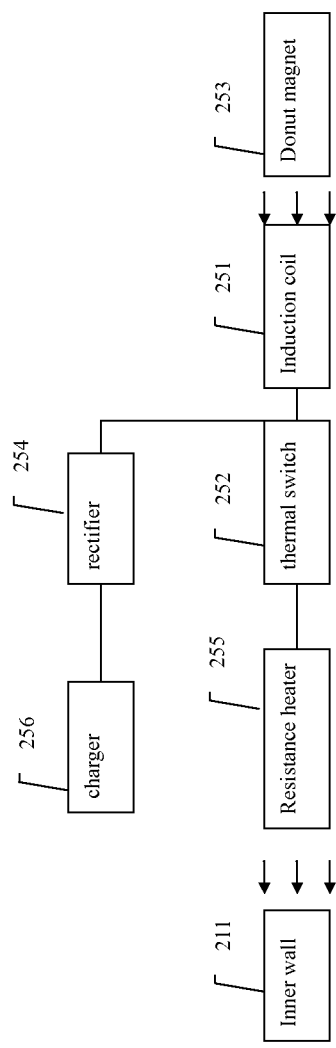
FIG. 3 is the illustration of the heating.
Figure 4:
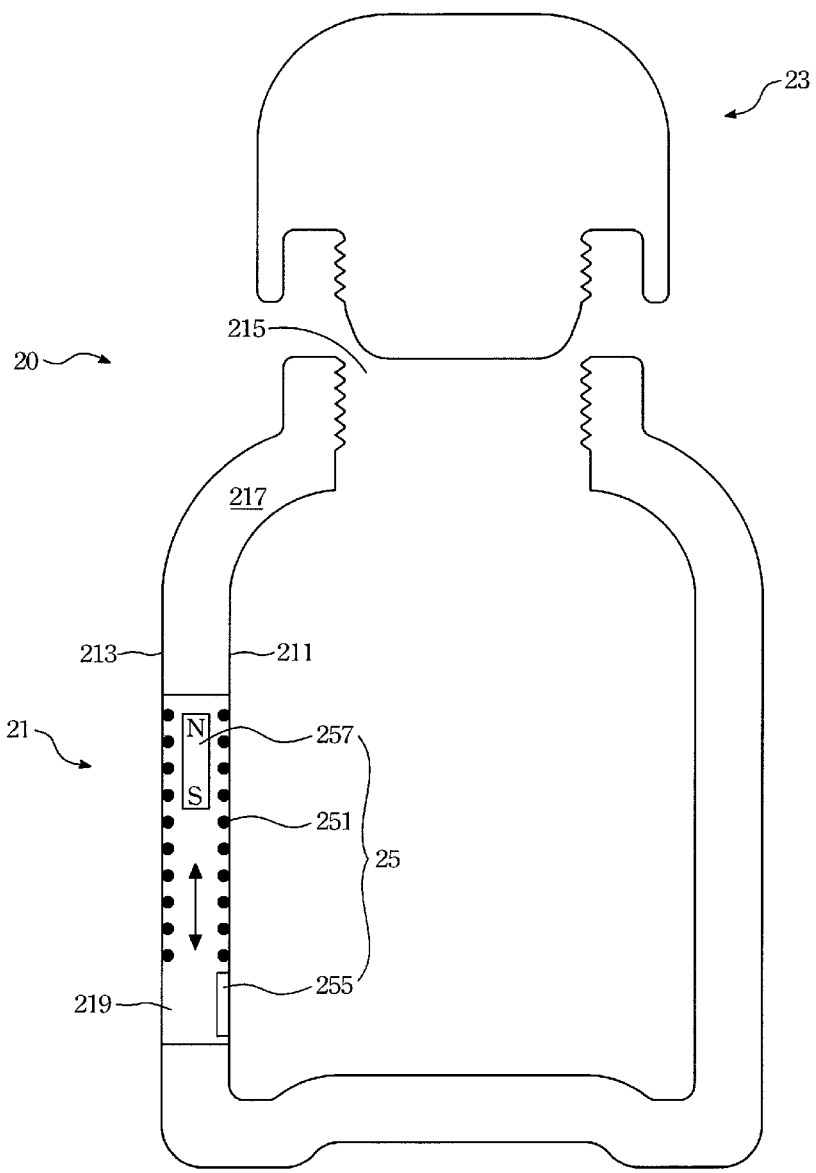
FIG. 4 is the second preferred embodiment of this thermos.
Figure 5:
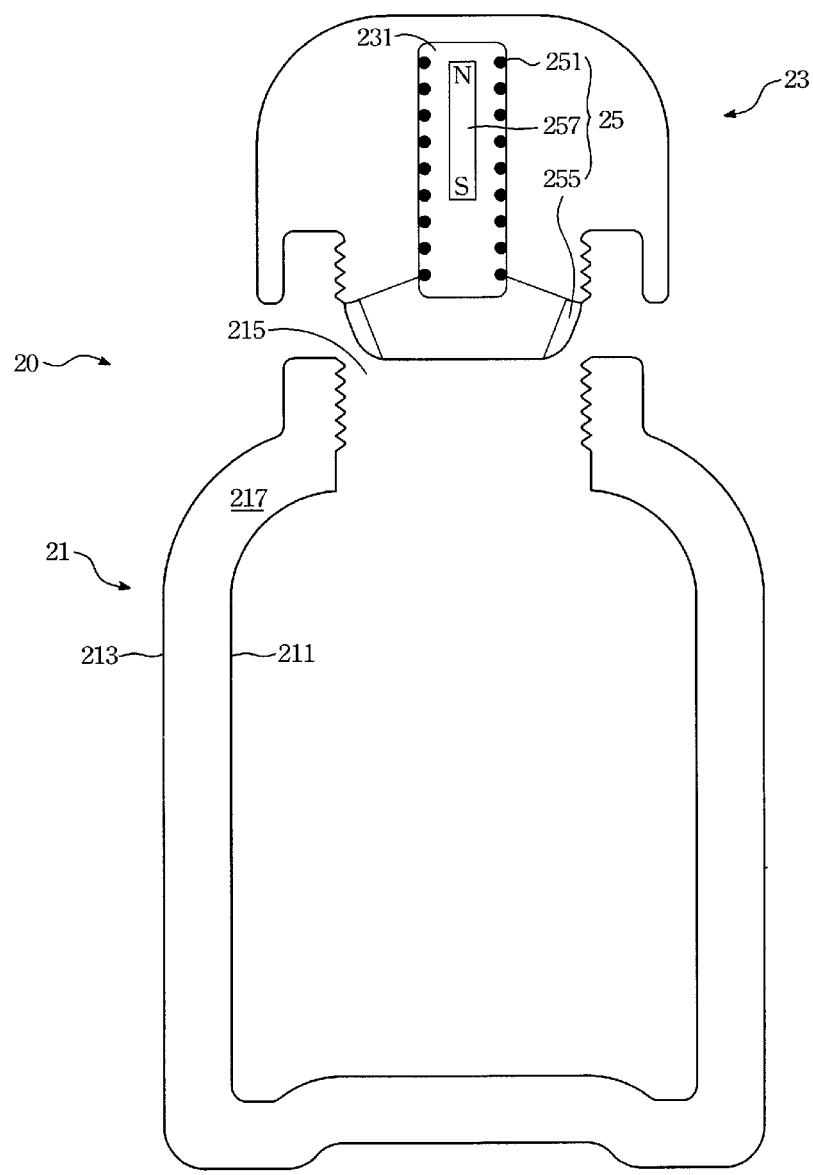
FIG. 5 is the third preferred embodiment of this thermos.

| 10~thermos | 12~body |
|---|---|
| 121~inner wall | 123~outer wall |
| 125~bottle opening | 127~intermediate space |
| 14~cap | |
| 20~thermos | 21~body |
| 211~inner wall | 213~outer wall |
| 215~bottle opening | 217~intermediate space |
| 219~heating room | 23~cap |
| 231~heating room | 25~heating device |
| 251~induction coil | 252~thermal switch |
| 253~donut magnet | 254~rectifier |
| 255~resistance heater | 256~charger |
| 257~bar magnet | |

The invention claimed is:

1. A thermos, comprising:
a body with an inner wall, an outer wall and a bottle opening, an intermediate space defined between the inner and outer walls;
a cap fitted to the bottle opening; and
a heating device, including:
an induction coil wound in the inner wall;
a donut magnet in the intermediate space to move freely within the intermediate space;
a resistance heater in circuit with the induction coil and touching the inner wall;
a thermal switch to disconnect an electrical connection between the induction coil and the resistance heater when a temperature of the thermos is higher than a set value; and
a rectifier and a charger, the rectifier to rectify an induced current for the charger.

2. A thermos, comprising:
a body with an inner wall, an outer wall, and a bottle opening, the inner and outer walls defining an intermediate space;
a cap fitted to the bottle opening; and
a heating device, including:
an induction coil in the intermediate space;
a bar magnet to move freely within the intermediate space;
a resistance heater in circuit with the induction coil, the resistance heater in contact with the inner wall
a thermal switch to disconnect the induction coil from the resistance heater when a temperature is higher than set value; and
a rectifier and a charger, the rectifier to rectify an induced current for use by the charger.

3. A thermos, comprising:
a bottle having an opening;
a cap fitted to the bottle opening, the cap defining an internal heating room; and
a heating device, including:
an induction coil in the heating room;
a bar magnet to move within the induction coil;
a resistance heater electrically connected to the induction coil, the resistance heater to heat the inner wall when the cap is fitted to the bottle opening
a thermal switch to sense a temperature of the thermos, the thermal switch to disconnect an electrical connection between the induction coil and the resistance heater when the temperature is higher than a set value; and
a rectifier and a charger, the rectifier to rectify an induced current, the rectified current to be used by the charger.

* * * * *